United States Patent
Deng et al.

(10) Patent No.: US 11,437,924 B2
(45) Date of Patent: Sep. 6, 2022

(54) SWITCHING POWER SUPPLY CIRCUIT

(71) Applicant: Silergy Semiconductor Technology (Hangzhou) LTD, Hangzhou (CN)

(72) Inventors: Jian Deng, Hangzhou (CN); Qiukai Huang, Hangzhou (CN); Chen Zhao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/114,781

(22) Filed: Dec. 8, 2020

(65) Prior Publication Data
US 2021/0194374 A1  Jun. 24, 2021

(30) Foreign Application Priority Data
Dec. 20, 2019  (CN) .................. 201911321782.8

(51) Int. Cl.
*H02M 7/217*  (2006.01)
*H02M 7/219*  (2006.01)
*H02M 1/42*  (2007.01)

(52) U.S. Cl.
CPC .......... *H02M 7/217* (2013.01); *H02M 1/4241* (2013.01); *H02M 1/4258* (2013.01); *H02M 7/219* (2013.01); *H02M 1/4233* (2013.01)

(58) Field of Classification Search
CPC .......... H02M 7/02; H02M 7/04; H02M 7/043; H02M 7/12; H02M 7/21; H02M 7/217; H02M 7/219; H02M 1/0048
See application file for complete search history.

(56) References Cited

U.S. PATENT DOCUMENTS

| | | |
|---|---|---|
| 6,005,780 A | 12/1999 | Hua |
| 6,580,258 B2 | 6/2003 | Wilcox et al. |
| 9,325,254 B2 | 4/2016 | Deng et al. |
| 9,331,588 B2 | 5/2016 | Chen |
| 9,488,680 B2 | 11/2016 | Xu |
| 9,755,505 B2* | 9/2017 | Usami ............. H02M 1/12 |
| 2008/0037290 A1* | 2/2008 | Suzuki ............. H02M 7/217 363/17 |
| 2013/0051102 A1* | 2/2013 | Huang ............. H02M 7/217 363/127 |
| 2014/0078789 A1 | 3/2014 | Li et al. |
| 2014/0239934 A1 | 8/2014 | Zhang |
| 2015/0160270 A1 | 6/2015 | Shi et al. |
| 2015/0280578 A1 | 10/2015 | Huang et al. |
| 2020/0099311 A1* | 3/2020 | Askarianabyaneh ........ H02M 1/4258 |
| 2020/0412238 A1* | 12/2020 | Zhu ............. H02M 1/4233 |
| 2021/0111637 A1* | 4/2021 | Xu ............. H02M 7/217 |

* cited by examiner

*Primary Examiner* — Gary L Laxton

(57) ABSTRACT

A switching power supply circuit can include: a high-frequency switch network configured to generate a high-frequency AC signal by performing high-frequency chopping on a low-frequency AC input signal; a transformer configured to receive the high-frequency AC signal at a primary winding thereof, to perform a voltage conversion on the high-frequency AC signal, and to generate an output signal at a secondary winding of the transformer; and a rectifier module configured to generate a DC signal by rectifying the output signal at the secondary winding of the transformer.

19 Claims, 21 Drawing Sheets

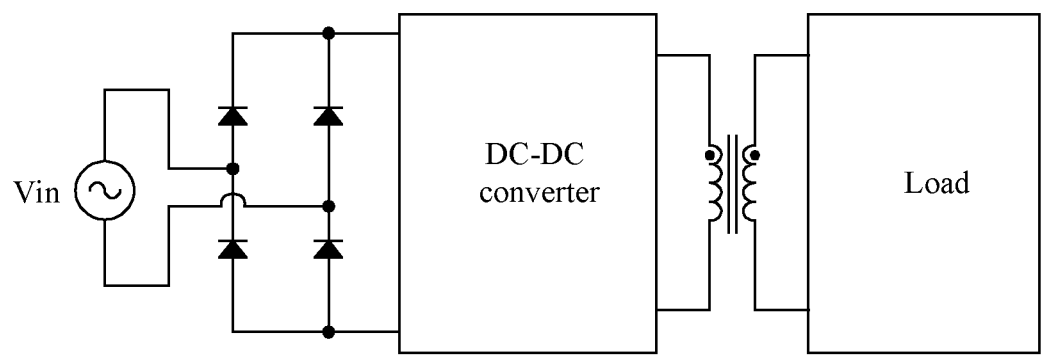
FIG. 1
(conventional)

(a)

(b)

(a)

(b)

SWITCHING POWER SUPPLY CIRCUIT

RELATED APPLICATIONS

This application claims the benefit of Chinese Patent Application No. 201911321782.8, filed on Dec. 20, 2019, which is incorporated herein by reference in its entirety.

FIELD OF THE INVENTION

The present invention generally relates to the field of power electronics, and more particularly to switching power supply circuitry.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

BRIEF DESCRIPTION OF THE DRAWINGS

FIG. 1 is a schematic diagram of an example switching power supply circuit.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Many semiconductor electronic devices need a switching power supply circuit that converts AC power into DC power, in order to obtain the DC power required for operation from the AC power grid. In most cases, in order to meet the requirements of safety performance, it is necessary to isolate the load from the power supply. Referring to FIG. 1, shown is a schematic diagram of an example switching power supply circuit, which can include a bridge rectifier, a DC-DC converter, and a transformer. The bridge rectifier can receive an AC input voltage, and an output terminal of the bridge rectifier can connect to an input terminal of the DC-DC converter. An output terminal of the DC-DC converter may be coupled with a primary winding of the transformer, and a secondary winding of the transformer maybe coupled with a load. In the switching power supply circuit, because of the bridge rectifier, excessive switches are needed, thereby causing large energy loss and low efficiency, particularly when the AC input voltage is low.

Figure 2:
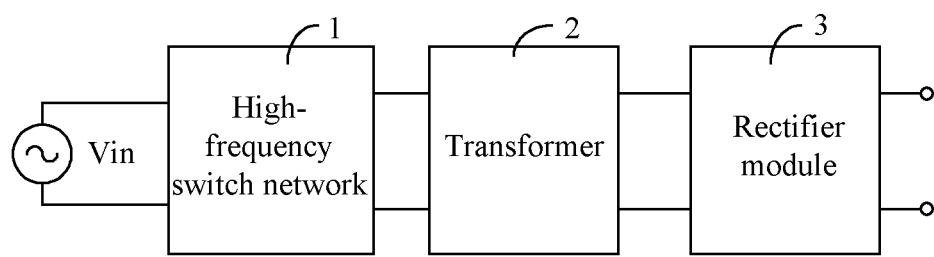
FIG. 2 is a schematic diagram of an example switching power supply circuit, in accordance with embodiments of the present invention.

Referring now to FIG. 2, shown is a schematic diagram of an example switching power supply circuit, in accordance with embodiments of the present invention. In this example, the switching power supply circuit can include high-frequency switch network 1, which can receive a low-frequency AC input signal (usually a power frequency AC signal), and can perform high-frequency chopping on the low-frequency AC input signal to generate a high-frequency AC signal. The switching power supply circuit can also include transformer 2, which can perform voltage conversion on the high-frequency AC signal received by a primary winding, and generates an output signal at a secondary winding. The switching power supply circuit can also include rectifier module 3 that can rectify the output signal of the secondary winding, and may generate a DC signal.

It should be noted that the low-frequency AC input signal can be sine wave or other types of AC signals, such as a rectangular wave. Other waveforms for the AP input signal other than a sine wave may also be supported in certain embodiments. In addition, the transformer can be an ordinary transformer or a piezoelectric transformer. Further, high-frequency switch network 1 can include an energy storage module. The low-frequency AC input signal can charge the energy storage module and the primary winding through a first loop in the high-frequency switch network. It should be noted that the polarity of the voltage across the primary winding can be the same or opposite to that of the low-frequency AC input signal. Also, the energy storage module can discharge the primary winding through a second loop in the high-frequency switch network. In addition, the first and second loops may not conduct at the same time.

The energy storage module can include at least one inductor and/or at least one capacitor. For example, the energy storage module can include a capacitor and an inductor, just a capacitor, or two capacitors and one inductor. In this example, high-frequency switch network 1 also can include a low-frequency AC input port, and first, second, third, and fourth switches. The low-frequency AC input port, the first and second switches, the primary winding, and the energy storage module can connect to form the first loop. The third and fourth switches, the primary winding, and the energy storage module can connect to form the second loop. Further, high-frequency switch network 1 can operate in one of a resonant state and a half-bridge buck state. It should be noted that the switches in certain embodiments can employ various existing electrically controllable switching devices, such as metal-oxide-semiconductor field-effect transistor (MOSFET), bipolar-junction transistor (BJT), or insulated-gate bipolar transistor (IGBT), to name a few.

The output terminal of the switching power supply circuit can be directly coupled with a load for power supply, such as supplying power to LED, charging batteries, and so on. The switching power supply circuit can also control the output voltage and/or current by single-stage active control, frequency adjustment, and so on. At this time, the output voltage and/or current can be controlled by adjusting the switching states of high-frequency switch network 1, such as the switching frequency. The switching power supply circuit can also operate by single-stage passive control; that is, operating in an open loop, and the switch power supply circuit can be used as a high-frequency transformer. The switching power supply circuit can also be coupled to a post-stage circuit, which can be coupled with a load to supply power to the load, such as supplying power to LED, charging batteries, and so on.

The post-stage circuit may generally be a DC-DC circuit. For example, the output voltage and/or current can be controlled by adjusting the switching states such as the switching frequency of the high-frequency switch network, and/or the DC-DC circuit. When the output voltage and/or current is controlled only by adjusting the switching frequency of the DC-DC circuit, the switching frequency of the high-frequency switch network can be under open-loop control. Further, the switching power supply circuit can be applied to power factor correction (PFC). Also, the switches in the rectifier module can be controlled under the primary side control, or independently under the secondary side control. In this way, the switching power supply circuit can directly convert the AC input signal into the DC signal with fewer switches and without a bridge rectifier, thereby reducing network stages and power loss, and improving efficiency.

Figure 3:
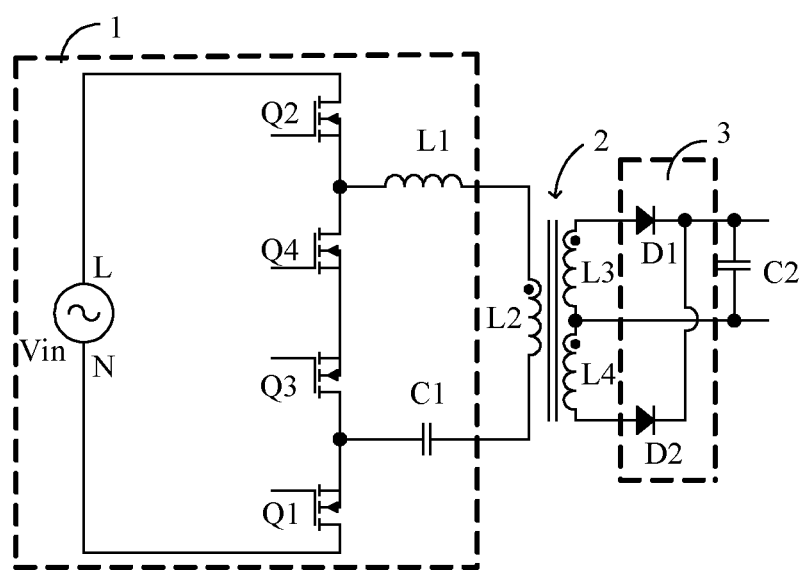
FIG. 3 is a schematic diagram of a first example switching power supply circuit, in accordance with embodiments of the present invention.

Referring now to FIG. 3, shown is a schematic diagram of a first example switching power supply circuit, in accordance with embodiments of the present invention. In this example, switching power supply can include high-frequency switch network 1, transformer 2, and rectifier module 3. In some embodiments, high-frequency switch network 1 can include a low-frequency AC input port, switches Q1, Q2, Q3, and Q4, and an energy storage module. First terminals of switches Q1 and Q2 may respectively be connected to terminals N and L of the low-frequency AC input port, a second terminal of switch Q1 can be coupled to a first terminal of switch Q3, a second terminal of switch Q2 can be coupled to a first terminal of switch Q4, and second terminals of switches Q3 and Q4 can be coupled together. Also, the energy storage module and primary winding L2 of transformer 2 may be coupled between first and second nodes, where the first node is a common node of switches Q1 and Q3, and the second node is a common node of switches Q2 and Q4.

The energy storage module can include at least one inductor and/or at least one capacitor. In some embodiments, the energy storage module can include inductor L1 and capacitor C1, and inductor L1, capacitor C1, and primary winding L2 can connect in series between the first and second nodes. In other embodiments, the energy storage module may only include a first capacitor, and the first capacitor and the primary winding can connect in series between the first and second nodes. In other embodiments, the energy storage module can include a first and second capacitors, and a first inductor, where the first capacitor, the first inductor and the primary winding can connect in series between the first and second nodes, and the second capacitor and the primary winding can connect in parallel. In some embodiments, the energy storage module may only include a first inductor, and the first inductor and the primary winding can connect in series between the first and second nodes. In other embodiments, the energy storage module can also be in other combinations of inductors and capacitors.

The secondary winding of transformer 2 also can include two secondary windings L3 and L4 connected in series. The common terminal of secondary windings L3 and L4 is the middle end of the secondary winding, the other terminal of secondary winding L3 is a first terminal of the secondary winding, and the other terminal of secondary winding L4 is a second terminal of the secondary winding. In other embodiments, transformer 2 can include a secondary winding with an intermediate tap, wherein the intermediate tap is the middle terminal of the secondary winding, and the other two terminals are the first and second terminals of the secondary winding, respectively.

Rectifier module 3 is a full-wave rectifier circuit, which can include rectifier devices D1 and D2. A first terminal of rectifier device D1 can connect to the first terminal of the secondary winding, and a second terminal of rectifier device D1 can connect to the high potential terminal of the output voltage. A first terminal of rectifier device D2 can connect to the second terminal of the secondary winding, and a second terminal of rectifier device D2 can connect to a second terminal of rectifier device D1. The middle terminal of the secondary winding is used as the low potential terminal of the output voltage. In other embodiments, rectifier module 3 can also be a full-bridge rectifier circuit and other types of rectifier circuits. The rectifier device in the embodiments is a diode, and various existing electrically controllable switching devices, such as MOSFET, BJT, or IGBT, can also be used in certain embodiments. For example, the switching states of the rectifier device can be controlled under primary side control, or the secondary side control. In particular embodiments, the switching power supply circuit also can include capacitor C2, which can connect in parallel to the output port of rectifier module 3 and can filter the output signal of rectifier module 3.

Figure 4:
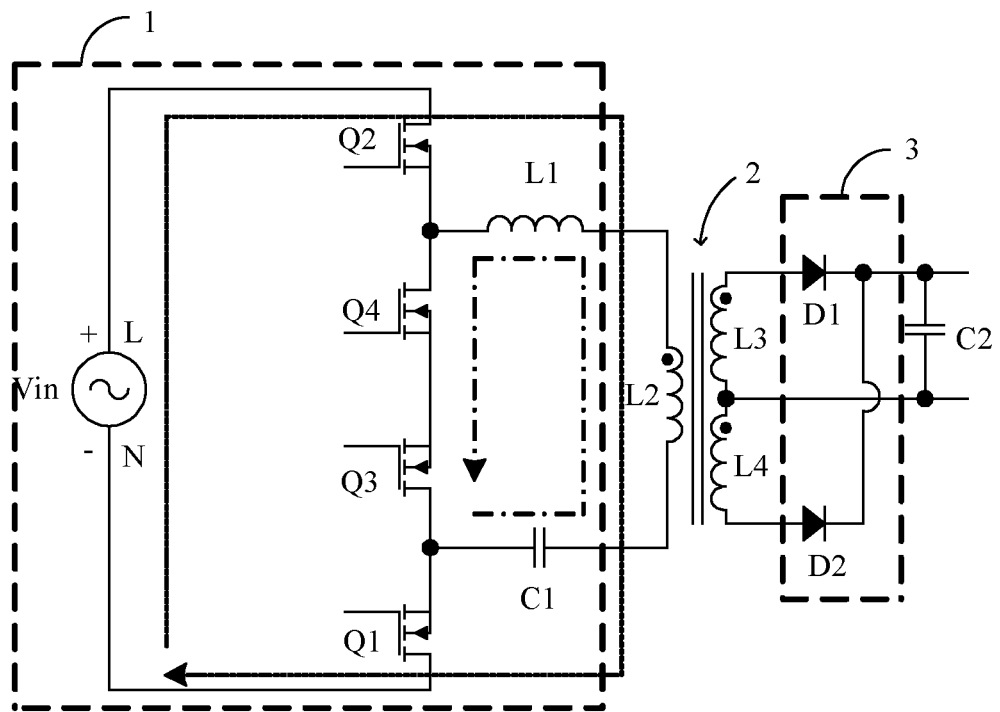
FIG. 4 is a waveform diagram of example operation of the first example switching power supply circuit in the positive half cycle, in accordance with embodiments of the present invention.
Figure 4:
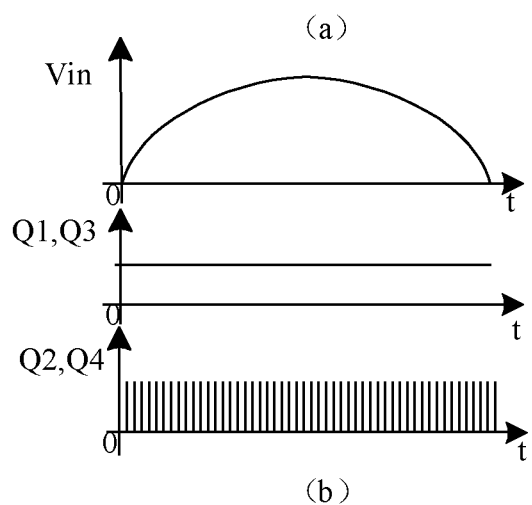

Referring now to FIG. 4, shown is a waveform diagram of example operation of the first example switching power supply circuit in the positive half cycle, in accordance with embodiments of the present invention. As shown in FIG. 4, (a) is a flow diagram of an average current in the positive half cycle, and (b) is a waveform diagram of control signals for the switching power supply circuit in the positive half cycle. In (b) of FIG. 4, when low-frequency AC input signal Vin is in the positive half cycle; that is, the voltage at L terminal is greater than that at N terminal. During the positive half cycle, switches Q1 and Q3 may remain on, and switches Q2 and Q4 can alternately be turned on or off in a high-frequency pulse-width modulation (PWM) mode. At this time, capacitor C1, inductor L1, and primary winding L2 may form an LLC resonant circuit, and switches Q1, Q2, Q3, and Q4 may operate under a resonant state, in order to realize high-frequency chopping. If capacitor C1 is too large to resonate, then switches Q1, Q2, Q3, and Q4 may operate in a half-bridge buck state, thus realizing high-frequency chopping. The frequency of the high-frequency PWM can be much higher than that of the low-frequency AC input signal.

When switch Q2 is turned on and switch Q4 is turned off, low-frequency AC input signal Vin can charge the energy storage module and primary winding L2. At this time, the direction of the average current is shown by the dashed line with an arrow in (a) of FIG. 4. When switch Q2 is turned off and switch Q4 is turned on, the energy storage module discharges primary winding L2, and the direction of the average current at this time is shown by the dotted line with an arrow in (a) of FIG. 4.

Figure 5:
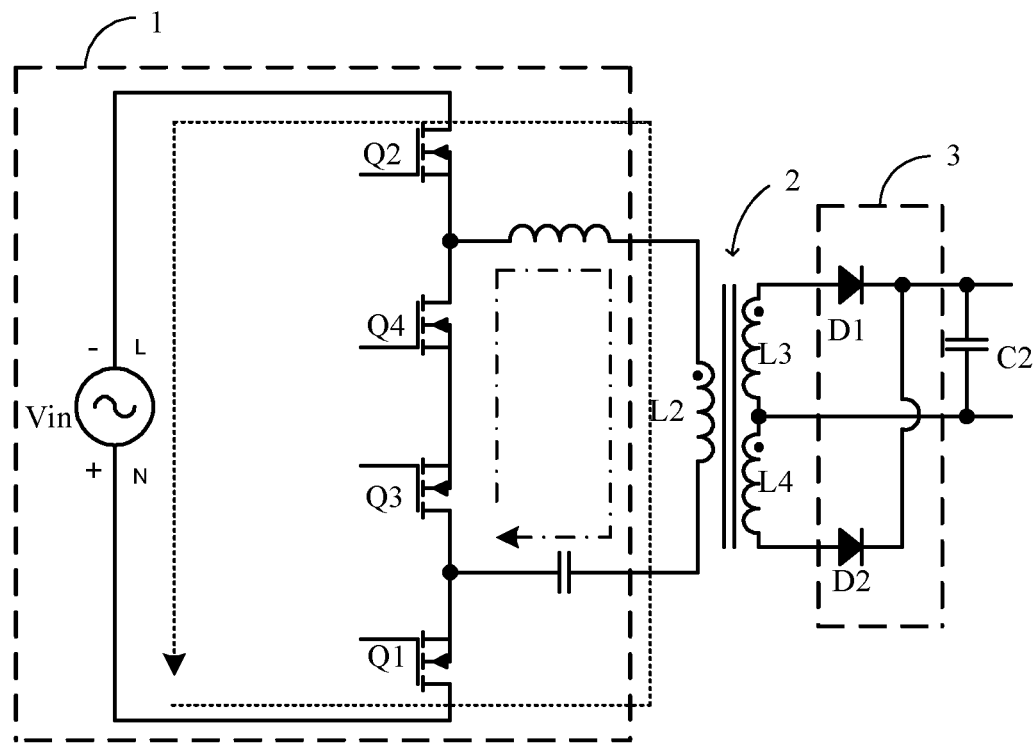
FIG. 5 is a waveform diagram of example operation of the first example switching power supply circuit in the negative half cycle, in accordance with embodiments of the present invention.
Figure 5:
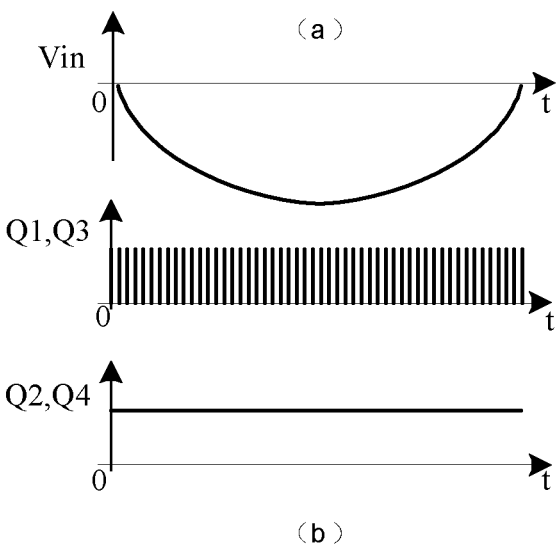

Referring now to FIG. 5, shown is a waveform diagram of example operation of the first example switching power supply circuit in the negative half cycle, in accordance with embodiments of the present invention. Diagram (a) of FIG. 5 is a flow diagram of an average current in the negative half cycle, and diagram (b) of FIG. 5 is a waveform diagram of control signals for the switching power supply circuit in the negative half cycle. As shown in (b), when low-frequency AC input signal Vin is in the negative half cycle; that is, the voltage at N terminal is greater than that at L terminal. During the negative half cycle, switches Q2 and Q4 may remain on, and switches Q1 and Q3 may alternately be turned on or off in a high-frequency PWM mode. At this time, capacitor C1, inductor L1, and primary winding L2 may form an LLC resonant circuit, and switches Q1, Q2, Q3, and Q4 may operate under a resonant state to realize high-frequency chopping. If capacitor C1 is too large to resonate, then switches Q1, Q2, Q3, and Q4 may operate in a half-bridge buck state, thus realizing high-frequency chopping. The frequency of the high-frequency PWM is much higher than that of the low-frequency AC input signal.

When switch Q1 is turned on and switch Q3 is turned off, low-frequency AC input signal Vin can charge the energy storage module and primary winding L2. At this time, the direction of the average current is shown by the dashed line with an arrow in (a) of FIG. 5. When switch Q1 is turned off and switch Q3 is turned on, the energy storage module discharges primary winding L2, and the direction of the average current at this time is shown by the dotted line with an arrow in (a) of FIG. 5.

Figure 6:
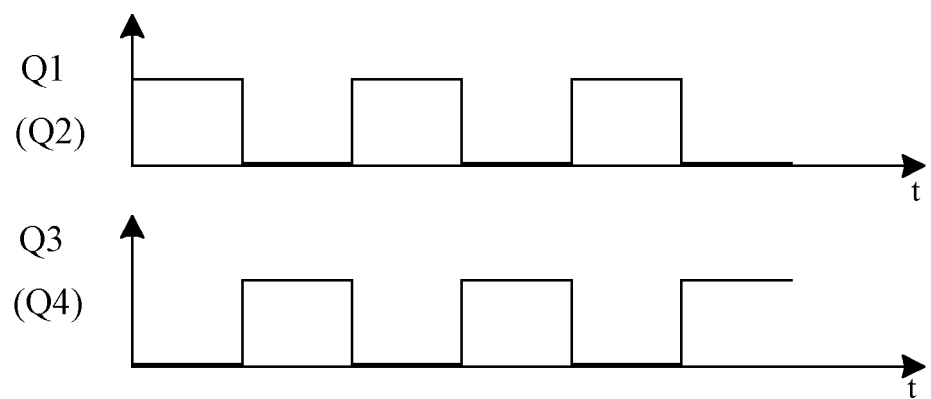
FIG. 6 is a waveform diagram of control signals for the first example switching power supply circuit, in accordance with embodiments of the present invention.

Referring now to FIG. 6, shown is a waveform diagram of control signals for the first example switching power supply circuit, in accordance with embodiments of the present invention. When low-frequency AC input signal Vin is in the positive half cycle, switches Q2 and Q4 may alternately be turned on or off in a high-frequency PWM manner. When input signal Vin is in the negative half cycle, switches Q1 and Q3 may alternately be turned on or off in a high-frequency PWM manner. Further, switches Q2 and Q4 can be turned on and off in a complementary way, and switches Q1 and Q3 can be turned on and off in a complementary way as an example, and the efficiency is the highest when complementary conduction is performed. However, in order to prevent the instantaneous short circuit caused by the turn-off delay of the switch, a dead time can be inserted between the state switching of switches Q2 and Q4, or switches Q1 and Q3.

Figure 7:
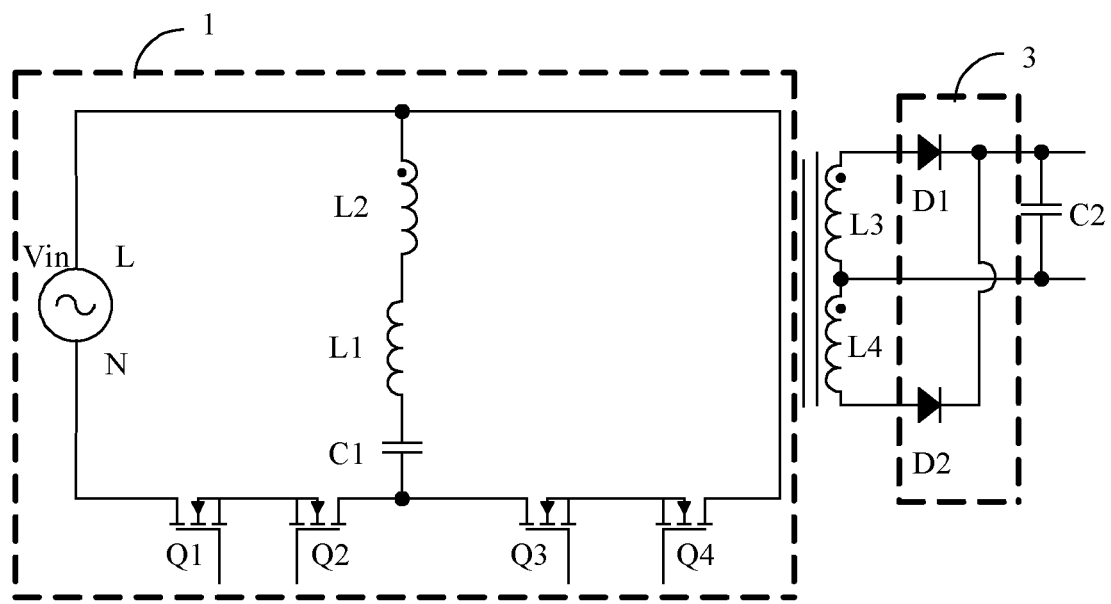
FIG. 7 is a schematic diagram of a second example switching power supply circuit, in accordance with embodiments of the present invention.

Referring now to FIG. 7, shown is a schematic diagram of a second example switching power supply circuit, in accordance with embodiments of the present invention. The switching power supply can include high-frequency switch network 1, transformer 2, and rectifier module 3. In some embodiments, high-frequency switch network 1 can include a low-frequency AC input port, switches Q1, Q2, Q3, and Q4, and an energy storage module. In this example, switches Q1-Q4 can be successively connected in series, and a first terminal of switch Q1 and a second terminal of switch Q4 may respectively be coupled to two terminals N and L of the low-frequency AC input port. In addition, the energy storage module and primary winding L2 of transformer 2 can be coupled between first and second nodes, where the first node is a common node of switches Q2 and Q3, and the second node is a common node of switch Q4 and terminal L.

Figure 8:
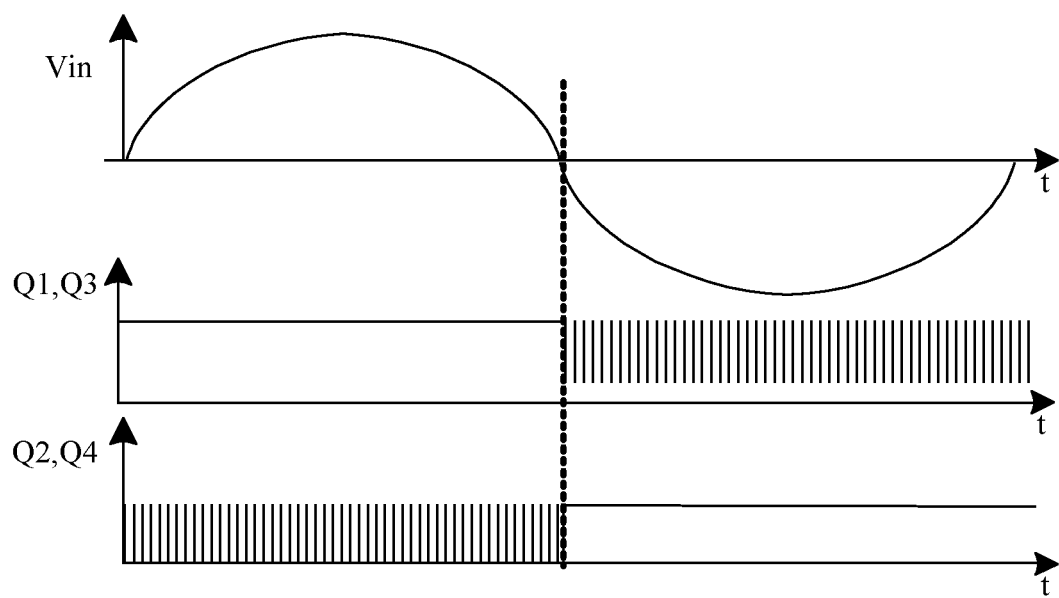
FIG. 8 is a waveform diagram of example operation of the second example switching power supply circuit, in accordance with embodiments of the present invention.

Referring now to FIG. 8, shown is a waveform diagram of example operation of the second example switching power supply circuit, in accordance with embodiments of the present invention. When low-frequency AC input signal Vin is in the positive half cycle, the voltage at L terminal is greater than that at N terminal. During the positive half cycle, switches Q1 and Q3 may remain on, and switches Q2 and Q4 may alternately be turned on or off in a high-frequency PWM mode. At this time, capacitor C1, inductor L1, and primary winding L2 may form an LLC resonant circuit, and switches Q1, Q2, Q3, and Q4 may operate under a resonant state. If capacitor C1 is too large to resonate, then switches Q1, Q2, Q3, and Q4 may operate in a half-bridge buck state. Similarly, when switch Q2 is turned on and switch Q4 is turned off, low-frequency AC input signal Vin can charge the energy storage module and primary winding L2. When switch Q2 is turned off and switch Q4 is turned on, the energy storage module may discharge primary winding L2.

When low-frequency AC input signal Vin is in the negative half cycle, the voltage at N terminal is greater than that at L terminal. During the negative half cycle, switches Q2 and Q4 may remain on, and switches Q1 and Q3 may alternately be turned on or off in a high-frequency PWM mode. At this time, capacitor C1, inductor L1, and primary winding L2 may form an LLC resonant circuit, and switches Q1, Q2, Q3, and Q4 may operate under a resonant state. If capacitor C1 is too large to resonate, then switches Q1, Q2, Q3, and Q4 may operate in a half-bridge buck state. Similarly, when switch Q1 is turned on and switch Q3 is turned off, low-frequency AC input signal Vin can charge the energy storage module and primary winding L2. When switch Q1 is turned off and switch Q3 is turned on, the energy storage module may discharge primary winding L2.

Figure 9:
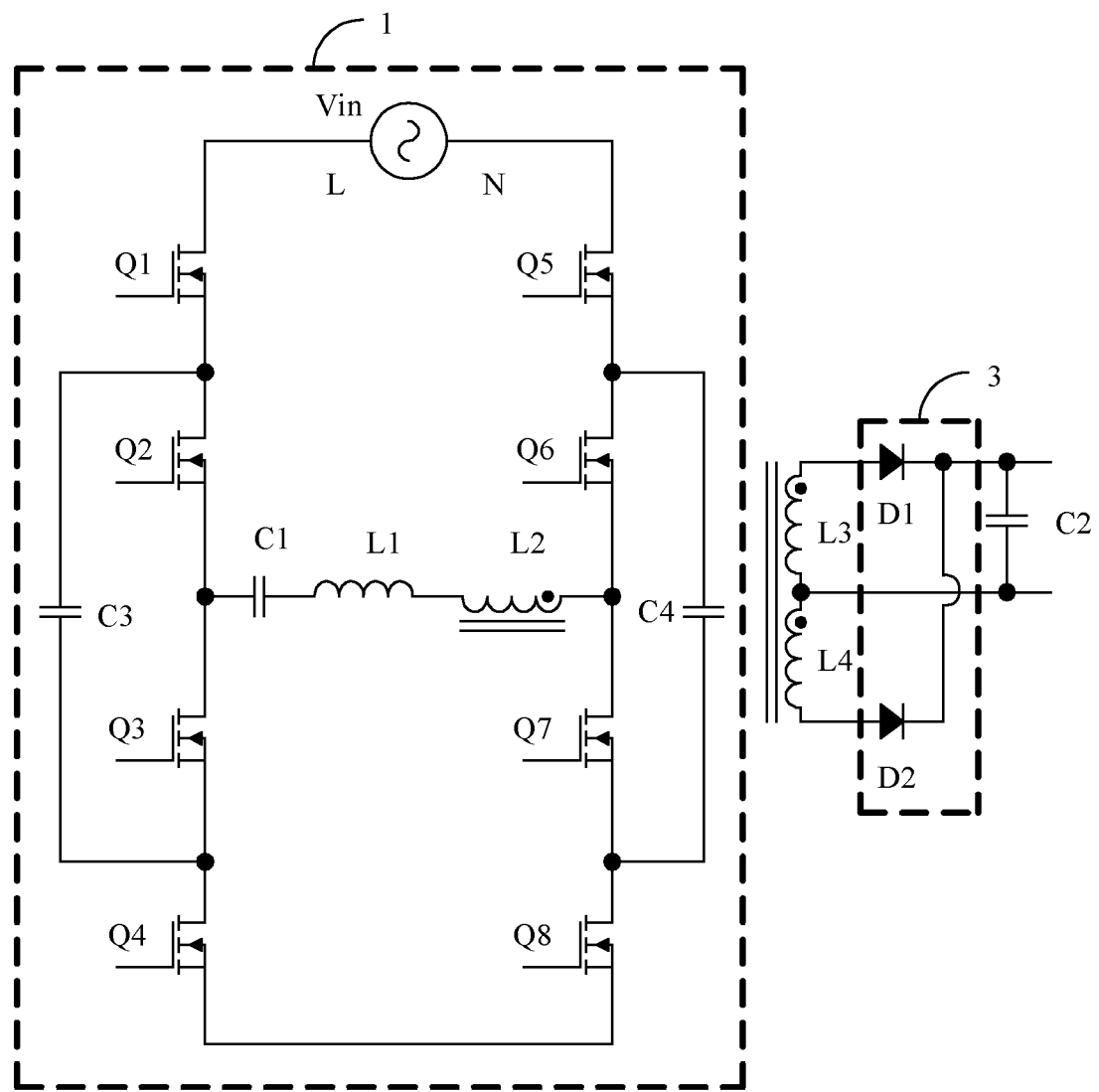
FIG. 9 is a schematic diagram of a third example switching power supply circuit, in accordance with embodiments of the present invention.

Referring now to FIG. 9, shown is a schematic diagram of a third example switching power supply circuit, in accordance with embodiments of the present invention. This example switching power supply can include high-frequency switch network 1, transformer 2, and rectifier module 3. In some embodiments, high-frequency switch network 1 can include a low-frequency AC input port, switches Q1-Q8, capacitors C3 and C4, and an energy storage module. Switches Q1-Q4 may successively be coupled in series, and switches Q5-Q8 can successively be coupled in series. In addition, first terminals of switches Q1 and Q5 may respectively be coupled to two terminals L and N of the low-frequency AC input port, and second terminals of switches Q4 and Q8 can be coupled together. Further, one terminal of capacitor C3 can be coupled to a common node of switches Q1 and Q2, the other terminal of capacitor C3 can be coupled to a common node of switches Q3 and Q4. One terminal of capacitor C4 can be coupled to a common node of switches Q5 and Q6, and the other terminal of capacitor C4 can be coupled to a common node of switches Q7 and Q8. Moreover, the energy storage module and the primary winding can be coupled between first and second nodes, where the first node is a common node of switches Q2 and Q3, and the second node is a common node of switches Q6 and Q7.

Figure 10:
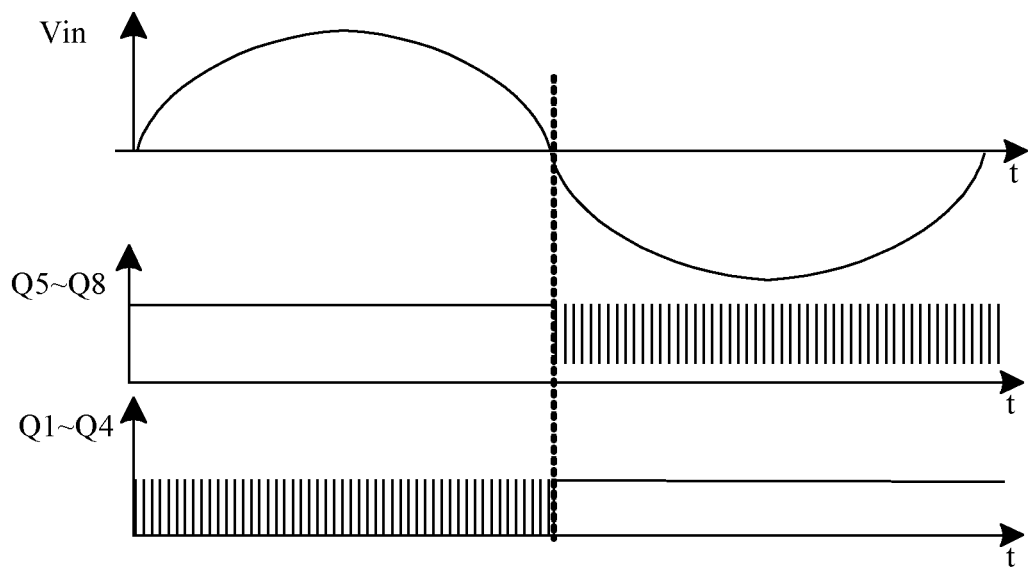
FIG. 10 is a waveform diagram of example operation of the third example switching power supply circuit, in accordance with embodiments of the present invention.

Referring now to FIG. 10, shown is a waveform diagram of example operation of the third example switching power supply circuit, in accordance with embodiments of the present invention. When low-frequency AC input signal Vin is in the positive half cycle, the voltage at L terminal is greater than that at N terminal. During the positive half cycle, switches Q5-Q8 may remain on, and switches Q1-Q4 can be turned on and off in a high-frequency PWM mode under a predetermined order. At this time, capacitor C1, inductor L1 and primary winding L2 may form an LLC resonant circuit, and switches Q1, Q2, Q3, and Q4 may operate under a resonant state. If capacitor C1 is too large to resonate, then switches Q1, Q2, Q3, and Q4 may operate in a half-bridge buck state.

When low-frequency AC input signal Vin is in the negative half cycle, the voltage at N terminal is greater than that at L terminal. During the negative half cycle, switches Q1-Q4 may remain on, and switches Q5-Q8 can be turned on or off in a high-frequency PWM mode under a specific order. At this time, capacitor C1, inductor L1, and primary winding L2 may form an LLC resonant circuit, and switches Q5-Q8 may operate under a resonant state. If capacitor C1 is too large to resonate, then switches Q5-Q8 may operate in a half-bridge buck state. Further, high-frequency switch network 1 can operate under different operation modes when the switching sequence is different, where first operation mode is a two-level operation mode, and the second operation mode is a three-level operation mode.

Figure 11:
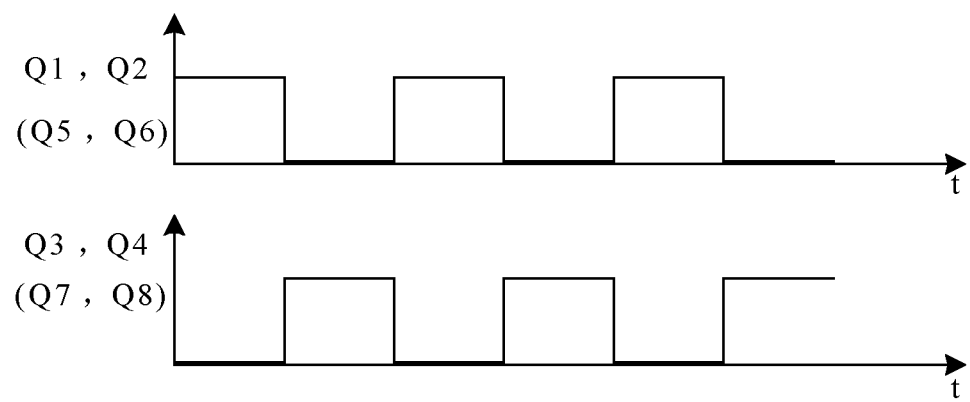
FIG. 11 is a waveform diagram of control signals for the third example switching power supply circuit under the first operation mode, in accordance with embodiments of the present invention.

Referring now to FIG. 11, shown is a waveform diagram of control signals for the third example switching power supply circuit under the first operation mode, in accordance with embodiments of the present invention. Under the first operation mode (two-level operation mode), when low-frequency AC input signal Vin is in the positive half cycle, switches Q5-Q8 may remain on, switches Q1 and Q2 can be turned on or off at the same time, and switches Q3 and Q4 may be turned on or off at the same time. Further, switch Q1 (and switch Q2) and switch Q3 (and switch Q4) may alternately be turned on or off in a high-frequency PWM mode. When low-frequency AC input signal Vin is in the negative half cycle, switches Q1-Q4 may remain on, switches Q5 and Q6 can be turned on or off at the same time, and switches Q7 and Q8 may be turned on or off at the same time. Further, switch Q5 (and switch Q2) and switch Q7 (and switch Q8) may alternately be turned on or off in a high-frequency PWM mode.

Figure 12:
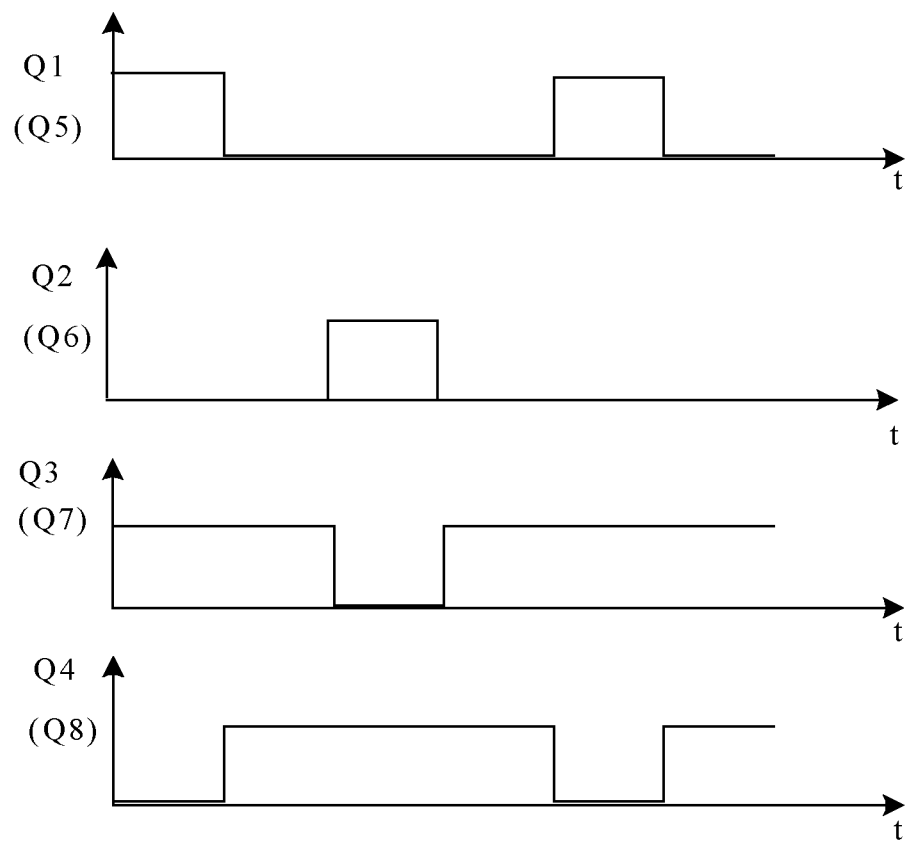
FIG. 12 is a waveform diagram of control signals for the third example switching power supply circuit under the second operation mode, in accordance with embodiments of the present invention.

Referring now to FIG. 12, shown is a waveform diagram of control signals for the third example switching power supply circuit under the second operation mode, in accordance with embodiments of the present invention. Under the second operation mode (three-level operation mode), when low-frequency AC input signal Vin is in the positive half cycle, switches Q5-Q8 may remain on, switches Q1 and Q4 can be turned on or off in an opposite way, and switches Q2 and Q3 may be turned on or off in an opposite way. Further, switches Q1 and Q2 can be turned on with a phase difference (e.g., 180 degrees). When low-frequency AC input signal Vin is in the negative half cycle, switches Q1-Q4 may remain on, switches Q5 and Q8 may be turned on or off in an opposite way, and switches Q6 and Q7 can be turned on or off in an opposite way. Further, switches Q5 and Q6 may be turned on with a phase difference (e.g., 180 degrees).

Figure 13:
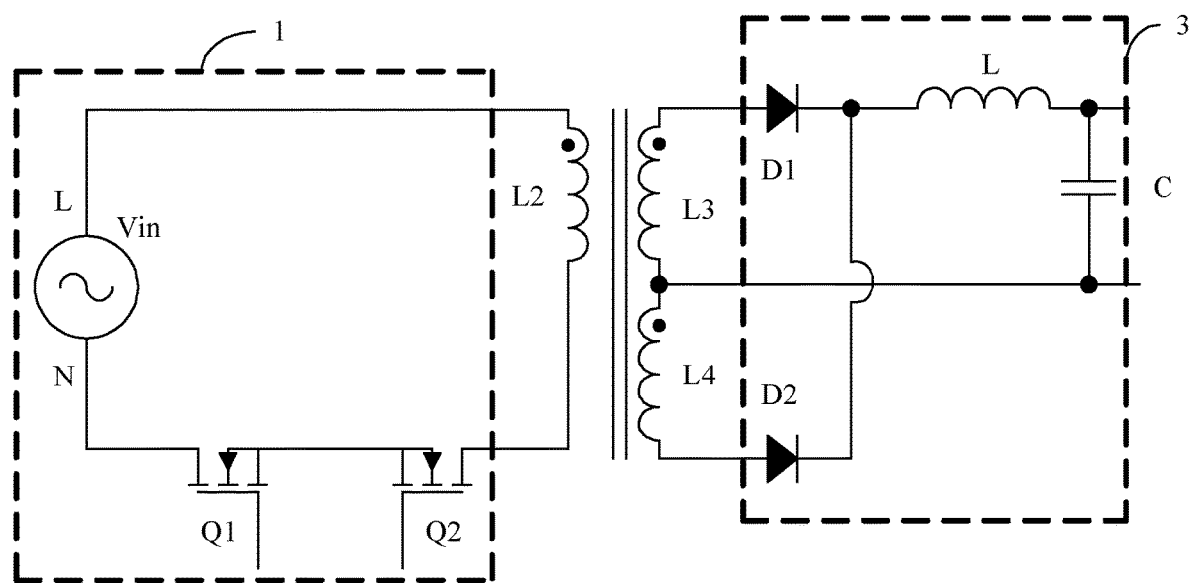
FIG. 13 is a schematic diagram of a fourth example switching power supply circuit, in accordance with embodiments of the present invention.

Referring now to FIG. 13, shown is a schematic diagram of a fourth example switching power supply circuit, in accordance with embodiments of the present invention. In this particular example, the switching power supply circuit can include high-frequency switch network 1, transformer 2, and rectifier module 3. In some embodiments, high-frequency switch network 1 can include a low-frequency AC input port, and switches Q1 and Q2, which are coupled in series with primary winding L2 of transformer 2 to form a loop. Rectifier module 3 can include rectifier devices D1 and D2, and a filter network. The filter network can include inductor L and capacitor C connected in series, and capacitor C can be coupled in parallel with the output port of the circuit. One terminal of the filter network can be coupled to a second terminal of rectifier device D1, a first terminal of rectifier device D1 can be coupled with the first terminal of the secondary winding, the other terminal of the filter network can be coupled to the middle terminal of the secondary winding. A first terminal of rectifier device D2 can be coupled to the second terminal of the secondary winding, and a second terminal of rectifier device D2 can be coupled to the second terminal of rectifier device D1. In this example, the rectifier device is a diode, and the first terminal of the rectifier device is the cathode and the second terminal of the rectifier device is the anode. It should be noted that various existing electrically controllable switching devices, such as MOSFET, BJT, or IGBT, can also be used in certain embodiments.

Figure 14:
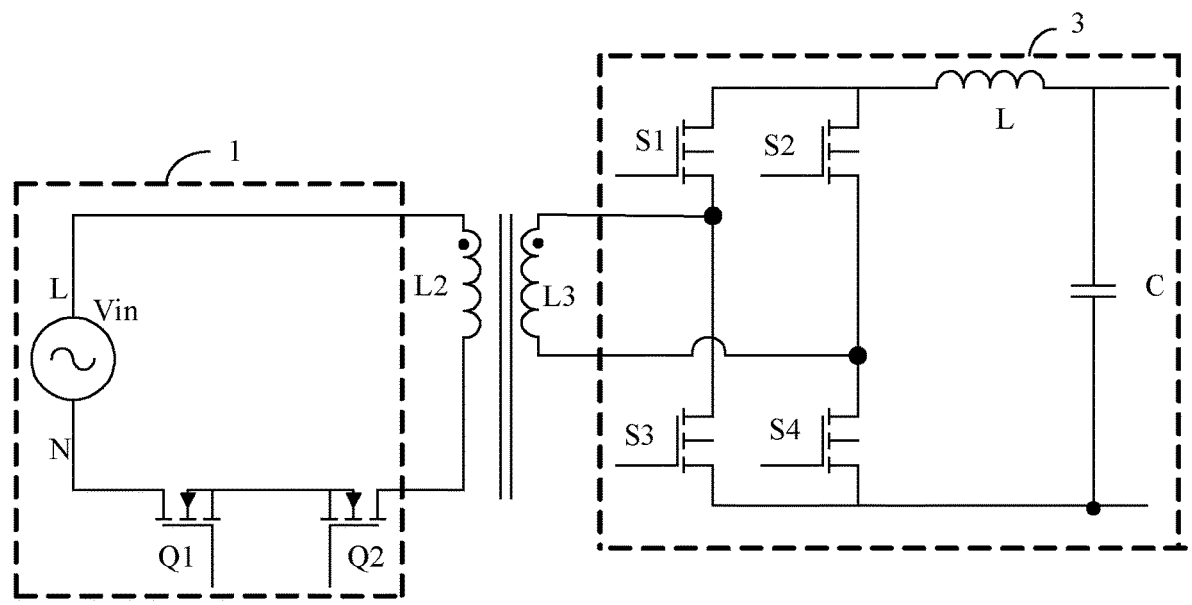
FIG. 14 is a schematic diagram of a fifth example switching power supply circuit, in accordance with embodiments of the present invention.

Referring now to FIG. 14, shown is a schematic diagram of a fifth example switching power supply circuit, in accordance with embodiments of the present invention. The switching power supply circuit can include high-frequency switch network 1, transformer 2, and rectifier module 3. In some embodiments, high-frequency switch network 1 can include a low-frequency AC input port, switches Q1 and Q2, which can be coupled in series with primary winding L2 of transformer 2 to form a loop. Here, transformer 2 can include primary winding L2 and secondary winding L3. Rectifier module 3 can include rectifier devices S1, S2, S3, and S4, and a filter network. The filter network can include inductor L and capacitor C connected in series, and capacitor C can be coupled in parallel with the output port of the circuit. In this example, rectifier devices S1-S4 may form a bridge rectifier topology. One terminal of the filter network can be coupled to first terminals of rectifier devices S1 and S2, and the other terminal of the filter network can be coupled to second terminals of rectifier devices S3 and S4. Secondary winding L3 can be coupled between first and second nodes, where the first node is a common node of rectifier devices S1 and S3, and the second node is a common node of rectifier devices S2 and S4. In this example, the rectifier device is a MOSFET, but in some cases can instead be a diode. Further, various existing electrically controllable switching devices, such as BJT, or IGBT, can also be used in certain embodiments.

Figure 15:
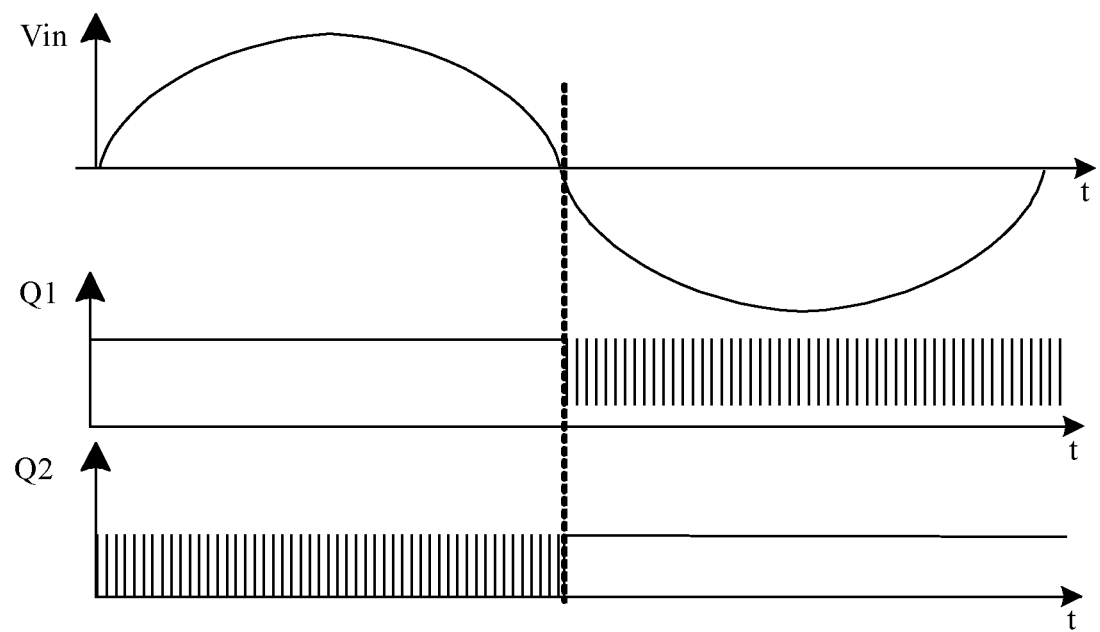
FIG. 15 is a waveform diagram of example operation of the fourth and fifth example switching power supply circuit, in accordance with embodiments of the present invention.

Referring now to FIG. 15, shown is a waveform diagram of example operation of the fourth and fifth example switching power supply circuit, in accordance with embodiments of the present invention. When low-frequency AC input signal Vin is in the positive half cycle, the voltage at L terminal is greater than that at N terminal. During the positive half cycle, switch Q1 may remain on, and switch Q2 can be turned on or off in a high-frequency PWM mode. Alternatively, switch Q1 may remain off (the body diode thereof may remain on), and switch Q2 can be turned on or off in a high-frequency PWM mode. In this example, the switching power supply circuit can operate under the buck mode. During the negative half cycle, switch Q2 may remain on, and switch Q1 can be turned on or off in a high-frequency PWM mode. Alternatively, switch Q2 may remain off (the body diode thereof may remain on), and switch Q1 can be turned on or off in a high-frequency PWM mode. Moreover, for the switching power supply circuit, the waveform of input current Iin can follow the sine wave of low-frequency AC input signal Vin and change synchronously therewith, thereby completing the PFC.

Figure 16:
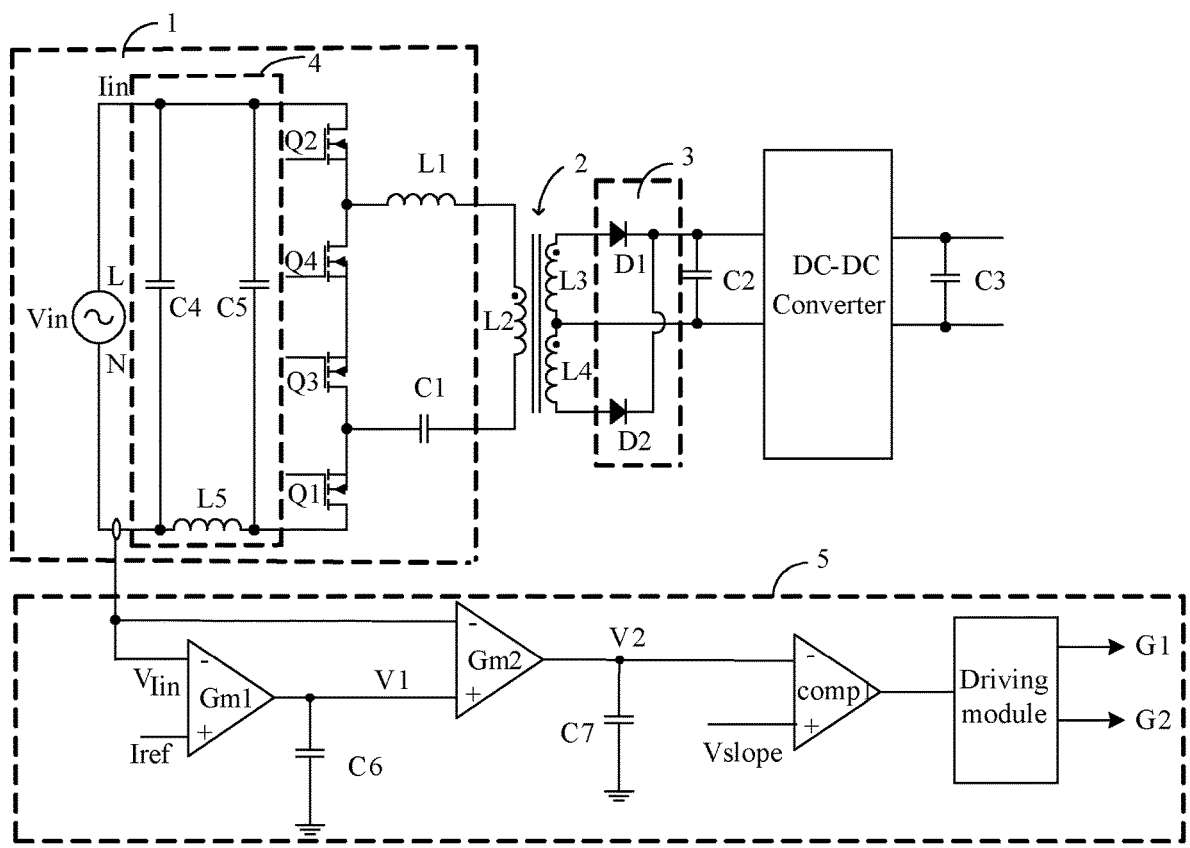
FIG. 16 is a schematic diagram of an example switching power supply circuit with power factor correction, in accordance with embodiments of the present invention.

Referring now to FIG. 16, shown is a schematic diagram of an example switching power supply circuit with power factor correction, in accordance with embodiments of the present invention. In this example, the switching power supply circuit also can include EMI filter 4 and control circuit 5. EMI filter 4 may be arranged at the input port of low-frequency AC input signal Vin, and control circuit 5 can control the switching states of high-frequency switch network 1, such that input current Iin can follow the sine wave of low-frequency AC input signal Vin and change synchronously therewith, thereby realizing PFC functionality. EMI filter 4 can include capacitors C4 and C5, and inductor L5. Here, capacitors C4 and C5 can connect in parallel with the input port of low frequency AC input signal Vin, and inductor L5 can connect between capacitors C4 and C5. It should be noted that EMI filter 4 can also be in other forms in certain embodiments.

Control circuit 5 can include error amplifiers Gm1 and Gm2, and a driving circuit. Error amplifier Gm1 can compare input current sampling signal $V_{Iin}$ characterizing input current Tin against current reference signal Iref to obtain error signal V1, where current reference signal Iref characterizes the current that follows the sine wave of low-frequency AC input signal Vin and changes synchronously therewith. Error amplifier Gm2 can compare input current sampling signal $V_{Iin}$ against error signal V1 to obtain error signal V2. The driving circuit can generate a driving signal according to error signal V2, in order to control the switching states of the switches in high-frequency switch network 1. For example, a non-inverting input terminal of error amplifier Gm1 may receive current reference signal Iref, and an inverting input terminal may receive input current sampling signal $V_{Iin}$. Also, error signal V1 can be used as a reference signal to be input to a non-inverting input terminal of error amplifier Gm2, and an inverting input terminal of error amplifier Gm2 may receive input current sampling signal $V_{Iin}$, such that error signal V2 is obtained by comparing input current sampling signal $V_{Iin}$ against error signal V1. Therefore, an input current control loop can be formed to control input current Iin to approach current reference signal Iref.

The driving circuit can include comparator comp1 and a driving module. One terminal of comparator comp1 may receive error signal V2, the other terminal of comparator comp1 receives ramp signal Vslope, and an output terminal of comparator comp1 can generate a driving signal for controlling the driving module to generate control signals G1 and G2, in order to control the switching states of the switches in high-frequency switch network 1. In particular embodiments, control signals G1 and G2 can control the switching states of the two groups of switches to be alternately turned on or off in each positive or negative half cycle of AC input signal Vin. Control circuit 5 also can include capacitor C6, which can connect between the output terminal of error amplifier Gm1 and the ground for converting the current signal generated by error amplifier Gm1 into a voltage signal (e.g., error signal V1). Control circuit 5 also can include capacitor C7 connected between the output terminal of error amplifier Gm2 and the ground for converting the current signal generated by error amplifier Gm2 into a corresponding voltage signal (e.g., error signal V2).

Figure 17:
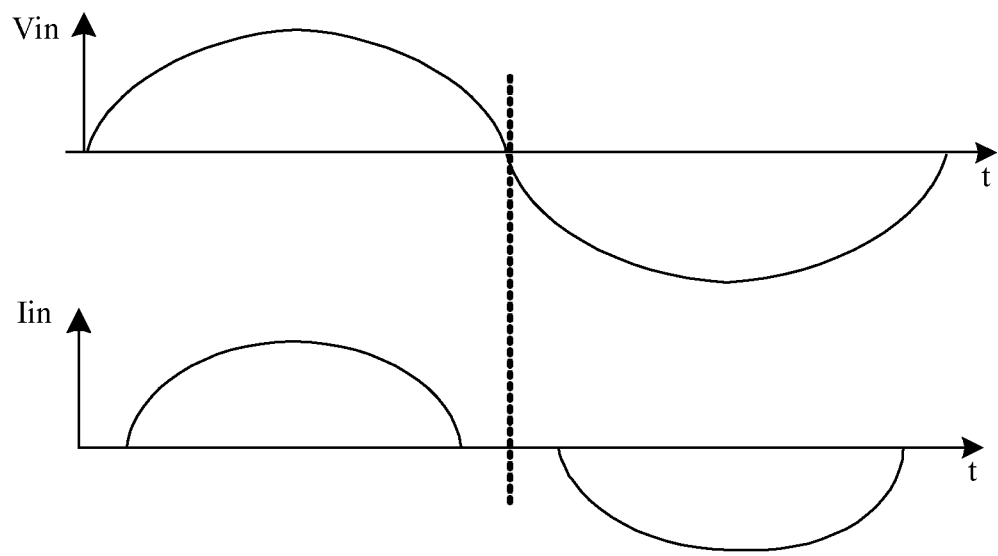
FIG. 17 is a waveform diagram of example operation of the switching power supply circuit with power factor correction, in accordance with embodiments of the present invention.

Referring now to FIG. 17, shown is a waveform diagram of example operation of the switching power supply circuit with power factor correction, in accordance with embodiments of the present invention. It can be seen that after PFC, the input current Iin follows the sine wave of the AC input signal Vin, and changes synchronously therewith. It should be understood that control circuit 5 is just one example to achieve PFC function, and those skilled in the art will recognize that other ways can be used to achieve the same PFC function. By controlling the switching states of the switches in the high-frequency switch network, the output current can meet the load requirements.

Figure 18:
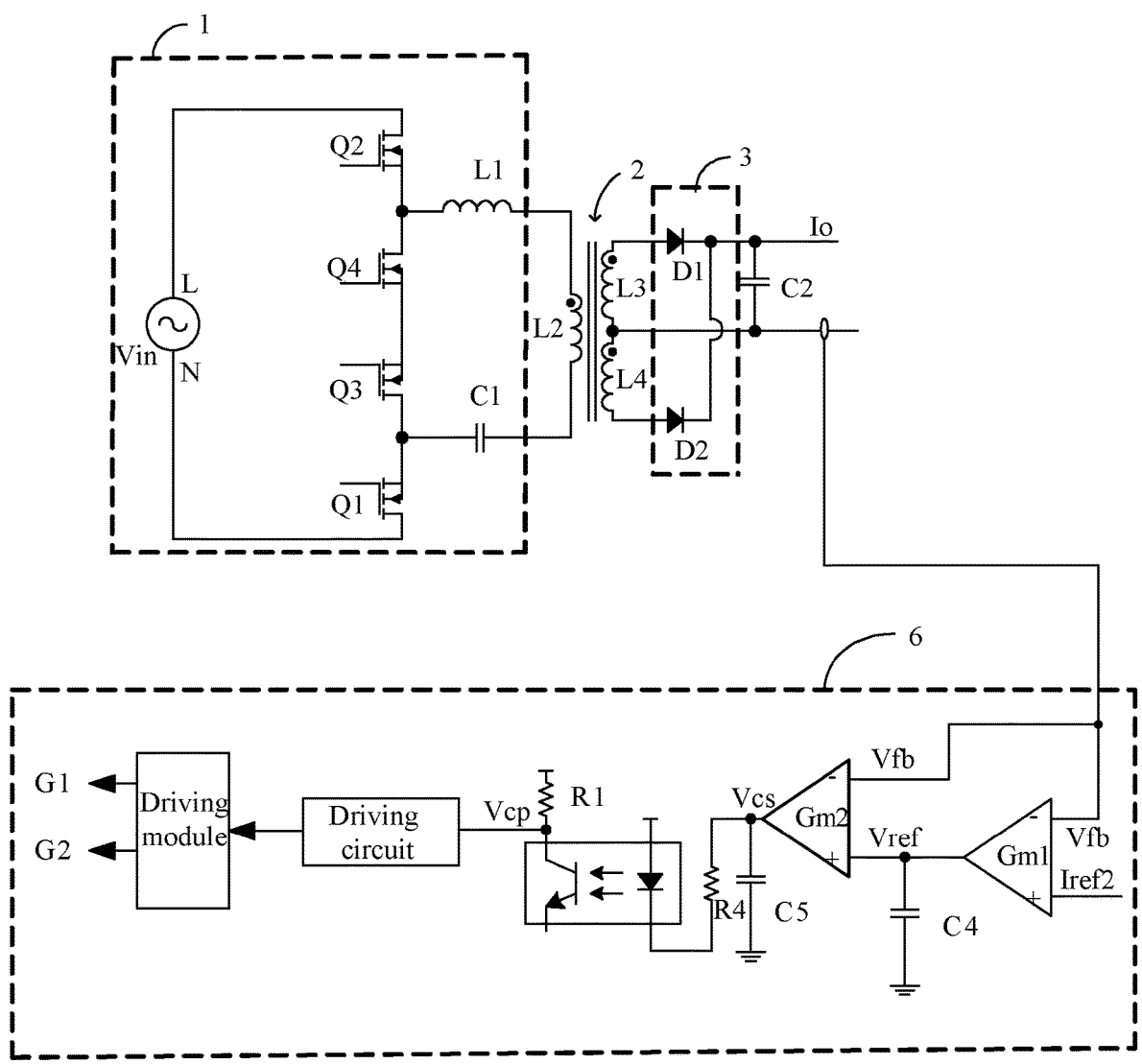
FIG. 18 is a schematic diagram of an example switching power supply circuit with output current control, in accordance with embodiments of the present invention.

Referring now to FIG. 18, shown is a schematic diagram of an example switching power supply circuit with output current control, in accordance with embodiments of the present invention. In this particular example, the switching power supply circuit can include control circuit 6 to control output current Io to meet the load requirements. Control circuit 6 can include error amplifiers Gm1 and Gm2, a compensation circuit, and a driving circuit. Error amplifier Gm1 can compare output current sampling signal Vfb characterizing output current Io against current reference signal Iref2 to obtain error signal Vref, where current reference signal Iref2 represents the required output current. Error amplifier Gm2 can compare output current sampling signal Vfb against error signal Vref to obtain error signal Vcs. The compensation circuit can generate compensation signal Vcp according to error signal Vcs. The driving circuit can generate driving signals PWMH and PWML according to compensation signal Vcp, in order to control the switching states of the switches in high-frequency switch network 1.

In this example, a non-inverting input terminal of error amplifier Gm1 may receive current reference signal Iref2, and an inverting input terminal may receive output current sampling signal Vfb. Therefore, an output signal generated by error amplifier Gm1 may represent a difference between actual output current and the required output current, such that an average current loop can be formed to control the average value of output current Io to approach current reference signal Iref2. Also, error signal Vref can be used as a reference signal to be input to a non-inverting input terminal of error amplifier Gm2, and an inverting input terminal of error amplifier Gm2 may receive output current sampling signal Vfb, such that error signal Vcs can be obtained by comparing output current sampling signal Vfb with error signal Vcs. Therefore, an instantaneous current loop can be formed to control the instantaneous value of output current Io by adjusting the switching frequency of high-frequency switch network 1.

The compensation circuit can include resistors R1 and R4, and an optical coupler, and compensation signal Vcp can be generated through the optical coupler based on error signal Vcs. The driving circuit can generate PWM driving signals PWMH and PWML according to compensation signal Vcp, and can control the driving module to generate control signals G1-G2, thereby controlling the switching states of the switches in high-frequency switch network 1. In particular embodiments, control signals G1 and G2 can control the switching states of the two groups of switches, which may alternately be turned on or off in the positive and negative half cycles of low frequency AC input signal Vin. In one embodiment, the driving circuit may generate driving signals PWMH and PWML by comparing compensation signal Vcp against ramp signal Vsaw.

Control circuit 6 also can include capacitor C4 connected between the output terminal of error amplifier Gm1 and the ground for converting the current signal generated by error amplifier Gm1 into a voltage signal (e.g., error signal Vref). Control circuit 6 can also include capacitor C5 connected between the output terminal of error amplifier Gm2 and the ground for converting the current signal generated by error amplifier Gm2 into a corresponding voltage signal Vcs. For example, in the positive half cycle of AC input signal Vin, switches Q1 and Q3 may remain on, and control signals G1 and G2 can respectively control the switching states of switches Q2 and Q4. In the negative half-cycle of input signal Vin, switches Q2 and Q4 may remain on, and control signals G1 and G2 may respectively control the switching states of switches Q1 and Q3.

Figure 19:
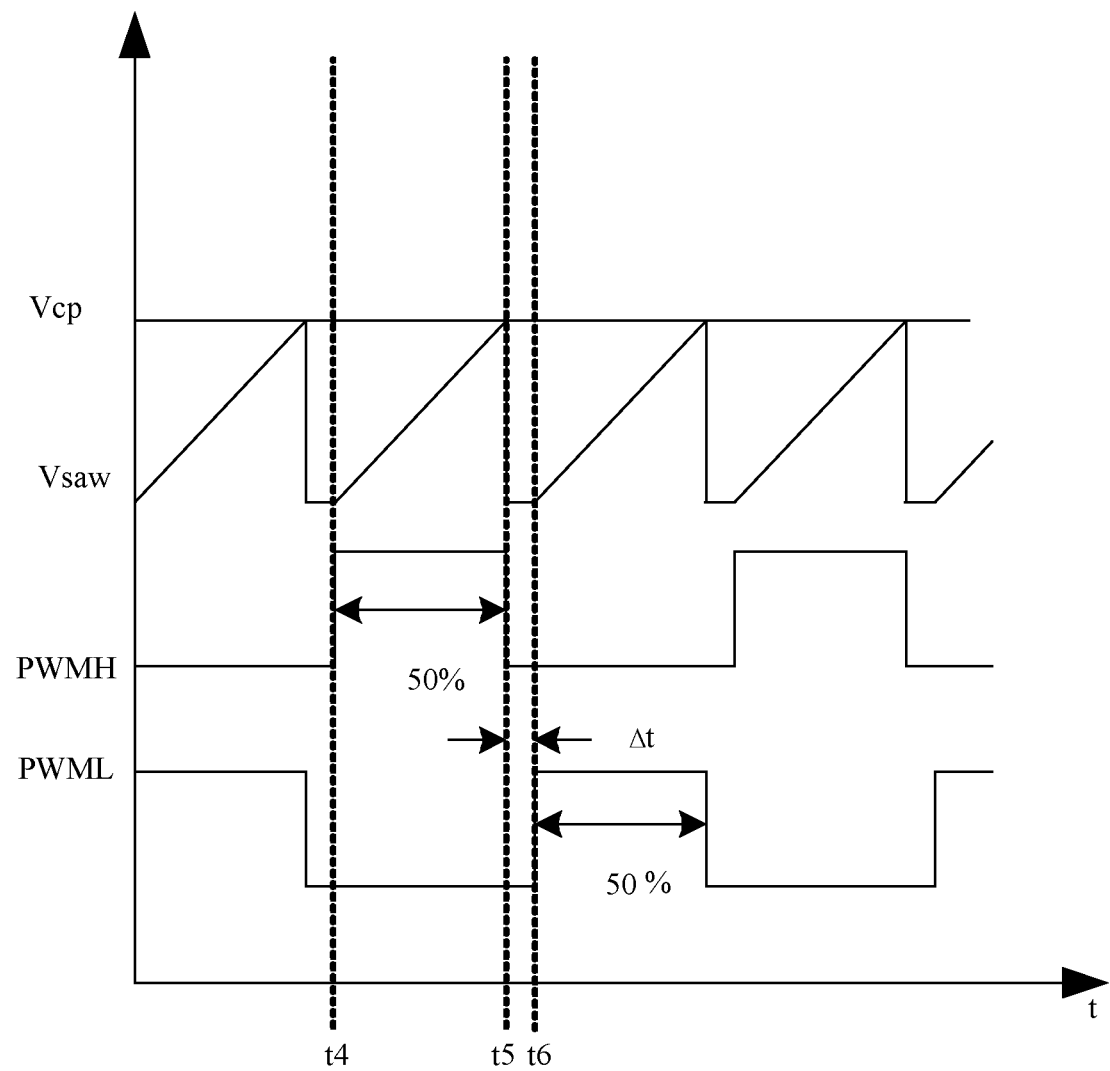
FIG. 19 is a waveform diagram of example operation of in the switching power supply circuit of FIG. 18, in accordance with embodiments of the present invention.

Referring now to FIG. 19, shown is a waveform diagram of example operation of in the switching power supply circuit of FIG. 18, in accordance with embodiments of the present invention. The abscissa is time t, and the ordinates respectively are compensation signal Vcp, ramp signal Vsaw, and PWM signals PWMH and PWML. For example, during the time period when switches Q1 and Q3 (or when switches Q2 and Q4) may alternately be turned on or off, at time t4, ramp signal Vsaw starts to rise, PWM signal PWMH transitions to be high, and PWM signal PWML may remain low. At time t5, ramp signal Vsaw rises to compensation signal Vcp, PWM signal PWMH transitions to low, and PWM signal PWML may remain low. After dead time Δt, at time t6, ramp signal Vsaw starts to rise, PWM signal PWMH remains low, and PWM signal PWML transitions to high. In this way, the duty ratio of the PWM signal can be 50% (not considering the dead time), such that DC-DC converter 2 can be controlled to operate at a fixed duty ratio.

Therefore, the working frequency of high-frequency switching network 1 can be adjusted according to a difference between current reference signal Iref2 and output current sampling signal Vfb, and then DC-DC converter 2 can operate at the adjusted working frequency with the fixed duty ratio, such that the average value of output current io may be adjusted to meet the charge requirements to charge the battery. At this time, the controlled output current is continuous. In some embodiments, the first to fourth switches in the high-frequency switch network only operate for a period of time in the whole cycle of the low-frequency AC input signal. For example, when the absolute value of the low-frequency AC input signal is greater than a first threshold value, the first, second, third and fourth switches in the high-frequency switch network can operate; otherwise, the high-frequency switch network may not work, such that the current generated by the rectifier module is in a pulse form, and the circuit at this time has higher operation efficiency.

Figure 20:
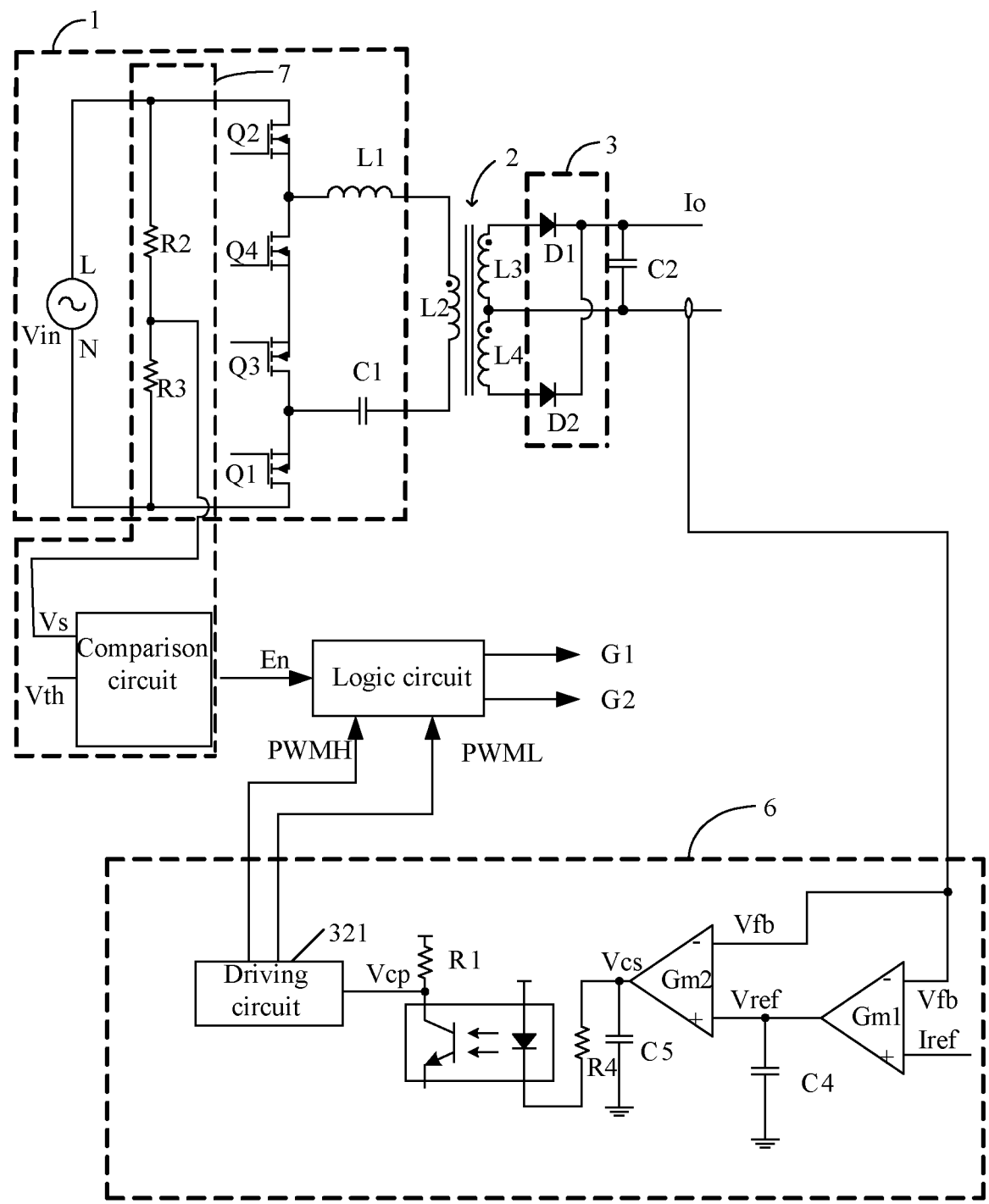
FIG. 20 is a schematic diagram of an example switching power supply circuit with discontinuous current control, in accordance with embodiments of the present invention.

Referring now to FIG. 20, shown is a schematic diagram of an example switching power supply circuit with discontinuous current control, in accordance with embodiments of the present invention. The switching power supply circuit can include control circuits 6 and 7, and a logic circuit. Control circuit 6 can generate driving signals PWMH and PWML according to output current Io, which is similar to control circuit 6 in FIG. 18. Control circuit 7 can generate control signal En according to AC input signal Vin and threshold Vth. The logic circuit can generate control signals G1 and G2 to control the switching states of the switches in the high-frequency switch network according to control signal En and driving signals PWMH and PWML, thereby adjusting output current Io. Further, the logic circuit can control the switches in high-frequency switch network 1 to operate with a fixed duty cycle at the operating frequency according to the driving signals PWMH and PWML, in response to the active control signal En. Also, in response to the inactive control signal En, the high-frequency switch network 1 may be controlled not to operate.

Control circuit 7 can include a comparison circuit and an input signal sampling circuit. The input signal sampling circuit can include resistors R2 and R3, which can connect in series between the AC input terminals L and N to obtain input voltage sampling signal Vs characterizing low-frequency AC input signal Vin. The comparison circuit can compare input voltage sampling signal Vs against threshold Vth to obtain control signal En. When the absolute value of input voltage sampling signal Vs is greater than threshold Vth, control signal En can be active (e.g., at a high level). When the absolute value of input voltage sampling signal Vs is less than threshold Vth, control signal En may be inactive (e.g., at a low level).

In response to inactive control signal En, the logic circuit may not generate control signals G1 and G2. In response to active control signal En, the logic circuit may generate control signals G1 and G2 according to driving signals PWMH and PWML to control high-frequency switch network 1 to operate at a fixed duty cycle at the operating frequency. As another example, in response to inactive control signal En, both control signals G1 and G2 can be generated to be at a low level, and in response to active control signal En, the logic circuit may generate driving signals PWMH and PWML as control signals G1 and G2. In particular embodiments, control signals G1 and G2 can control the switching states of two groups of switches in the switching power supply circuit, which may alternately be turned on or off in the positive or negative half cycle of AC input signal Vin.

Figure 21:
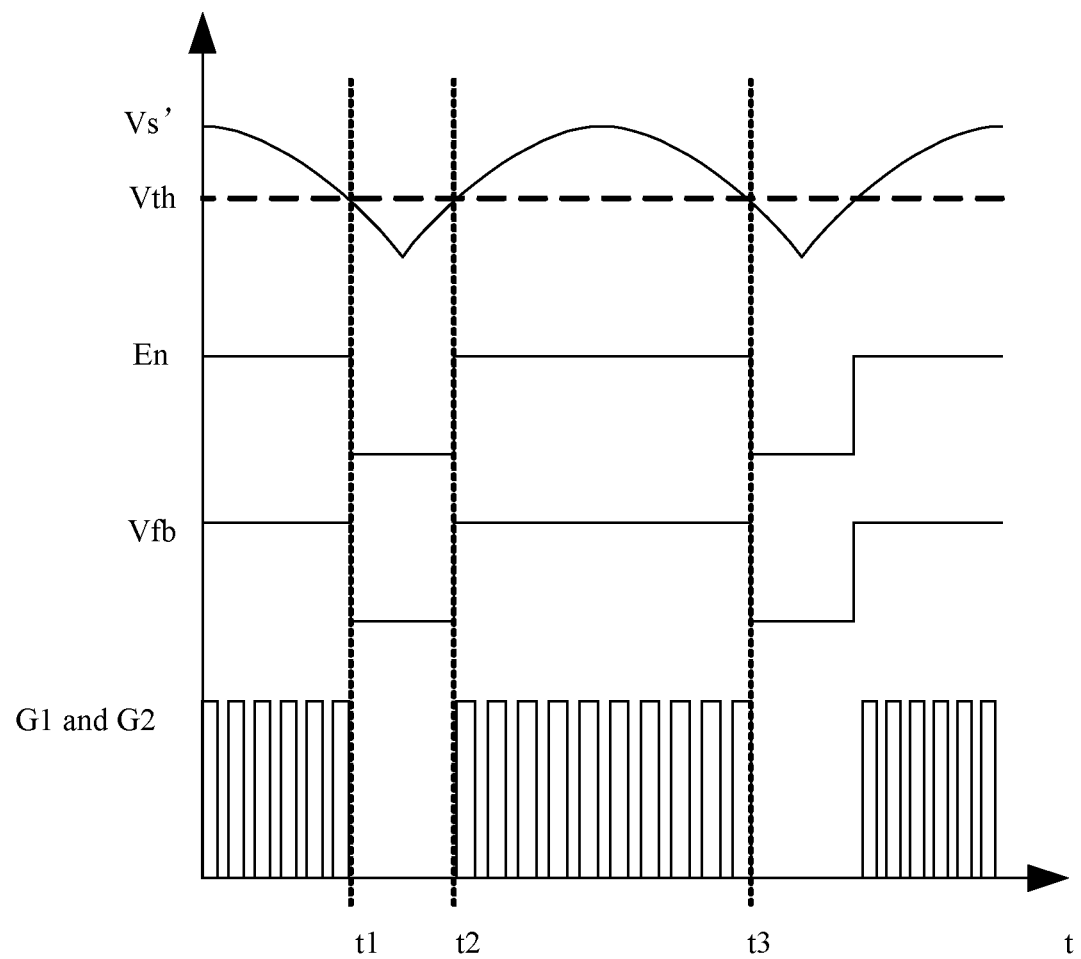
FIG. 21 is a waveform diagram of example operation of the switching power supply circuit of FIG. 20, in accordance with embodiments of the present invention.

Referring now to FIG. 21, shown is a waveform diagram of example operation of the switching power supply circuit of FIG. 20, in accordance with embodiments of the present invention. The abscissa is time t, and the ordinate respectively are absolute value Vs' of input voltage sampling signal Vs, threshold Vth, control signal En, output current sampling signal Vfb, and control signals G1 and G2 (PWM signals). For example, after time t1, absolute value Vs' of input voltage sampling signal Vs drops to be less than threshold Vth, and thus control signal En transitions to low. Then, the logic circuit may not generate control signals G1 and G2, and can control high-frequency switch network 1 to be disabled. In other words, switches Q2 and Q4 (or switches Q1 and Q3) can be turned off, such that output current Io is zero (or close to zero), and thus output current sampling signal Vfb is zero.

After time t2, absolute value Vs' of input voltage sampling signal Vs rises to be greater than threshold Vth, after that control signal En is switched to be at a high level. Then, the logic circuit may generate control signals G1 and G2 to control the operation of high-frequency switching network 1. In this example, switches Q2 and Q4 (or switches Q1 and Q3) may alternately be turned on or off, such that output current Io increases at a high value and thus output current sampling signal Vfb increases at a high value. After time t3, absolute value Vs' of input voltage sampling signal Vs drops to be less than threshold Vth again, and so on. In one time period of each cycle, switches Q2 and Q4 (or switches Q1 and Q3) may remain in an off state at the same time, such that output current Io is zero. In the other time period of each cycle, switches Q2 and Q4 (or switches Q1 and Q3) may alternately be turned on or off, which makes output current Io higher. Therefore, output current Io can be a pulse current.

Furthermore, during the positive half-cycle of AC input signal Vin, switches Q1 and Q3 may remain on. When control signal En transitions to a low level, switches Q2 and Q4 can be turned off, such that output current Io is zero. When control signal En is switched to a high level, switches Q2 and Q4 may alternately be turned on or off according to control signals G1 and G2, respectively, such that output current Io goes high. During the negative half-cycle of AC input signal Vin, switches Q2 and Q4 may remain on. When the control signal En goes low switches Q1 and Q3 can be turned off, such that output current Io is zero. When control signal En goes high, switches Q1 and Q3 may alternately be turned on or off according to control signals G1 and G2, respectively, such that output current Io changes to be high.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A switching power supply circuit, comprising:
    a) a high-frequency switch network configured to generate a high-frequency AC signal by performing high-frequency chopping on a low-frequency AC input signal;
    b) a transformer configured to receive the high-frequency AC signal at a primary winding thereof, to perform a voltage conversion on the high-frequency AC signal, and to generate an output signal at a secondary winding of the transformer;
    c) a rectifier module configured to generate a DC signal by rectifying the output signal at the secondary winding of the transformer;
    d) wherein when an absolute value of the low-frequency AC input signal is greater than a first threshold, the high-frequency switch network operates; and
    e) wherein when the absolute value of the low-frequency AC signal is not greater than the first threshold, the high-frequency switch network does not operate, such that an output current generated by the rectifier module is in a pulse form.

2. The switching power supply circuit of claim 1, wherein:
    a) the high-frequency switch network comprises an energy storage module;
    b) the energy storage module and the primary winding are charged by the low-frequency AC input signal through a first loop in the high-frequency switch network;
    c) the energy storage module discharges the primary winding through a second loop in the high-frequency switch network; and
    d) the first and second loops do not operate at the same time.

3. The switching power supply circuit of claim 1, wherein:
    a) the high-frequency switch network comprises a low-frequency AC input port, first, second, third, fourth, fifth, sixth, seventh, and eighth switches, third and fourth capacitors, and an energy storage module;
    b) the first, second, third, and fourth switches are successively coupled in series;
    c) the fifth, sixth, seventh, and eighth switches are successively coupled in series;
    d) first terminals of the first and fifth switches are respectively coupled to two terminals of the low-frequency AC input port;
    e) second terminals of the fourth and eighth switches are coupled together;
    f) one terminal of the third capacitor is coupled to a common node of the first and second switches, the other terminal of the third capacitor is coupled to a common node of the third and fourth switches;
    g) one terminal of the fourth capacitor is coupled to a common node of the fifth and sixth switches, and the other terminal of the fourth capacitor is coupled to a common node of the seventh and eighth switches;
    h) the energy storage module and the primary winding are coupled between first and second nodes;
    i) the first node is a common node of the second and third switches; and
    j) the second node is a common node of the sixth and seventh switches.

4. The switching power supply circuit of claim 2, wherein the energy storage module comprises at least one of an inductor and a capacitor.

5. The switching power supply circuit of claim 1, wherein the high-frequency switch network operates under one of a resonant state and a half-bridge buck state.

6. The switching power supply circuit of claim 3, wherein:
    a) during a positive half cycle of the low-frequency AC input signal, the fifth, sixth, seventh, and eighth switches remain on, and the first, second, third, and fourth switches are turned on or off in a high-frequency PWM mode under a predetermined order; and
    b) during a negative half cycle of the low-frequency AC input signal, the first, second, third, and fourth switches remain on, and the fifth, sixth, seventh, and eighth switches are turned on or off in the high-frequency PWM mode under a predetermined order.

7. The switching power supply circuit of claim 6, wherein:
a) under a first operation mode, during a positive half cycle of the low-frequency AC input signal, the fifth, sixth, seventh, and eighth switches remain on, the first and second switches are turned on or off at the same time, the third and fourth switches are turned on or off at the same time, and the first and third switches are alternately turned on or off in a high-frequency PWM mode; and
b) under the first operation mode, during a negative half cycle of the low-frequency AC input signal, the first, second, third, and fourth switches remain on, the fifth and sixth switches are turned on or off at the same time, the seventh and eighth switches are turned on or off at the same time, and the fifth and seventh switches are alternately turned on or off in the high-frequency PWM mode.

8. The switching power supply circuit of claim 6, wherein:
a) under a second operation mode, during a positive half cycle of the low-frequency AC input signal, the fifth, sixth, seventh, and eighth switches remain on, the first and fourth switches are turned on or off in an opposite way, the second and third switches are turned on or off in an opposite way, and the first and second switches are turned on with a phase difference; and
b) under the second operation mode, during a negative half cycle of the low-frequency AC input signal, the first, second, third, and fourth switches remain on, the fifth and eighth switches are turned on or off in an opposite way, the sixth and seventh switches are turned on or off in an opposite way, and the fifth and sixth switches are turned on with the phase difference.

9. The switching power supply circuit of claim 1, wherein the switching power supply circuit comprises a high-frequency transformer, and switching states of switches in the switching power supply circuit are controlled under open loop control.

10. The switching power supply circuit of claim 1, wherein switching states of switches in the switching power supply circuit are controlled for an output signal of the rectifier module to meet load requirements.

11. The switching power supply circuit of claim 1, wherein a switching frequency of switches in the switching power supply circuit are controlled for an output signal of the rectifier module to meet load requirements.

12. The switching power supply circuit of claim 1, wherein the high-frequency switch network only operates during a part of each cycle of the low-frequency AC input signal, such that an output current generated by the rectifier module is in a pulse form.

13. A switching power supply circuit, comprising:
a) a high-frequency switch network configured to generate a high-frequency AC signal by performing high-frequency chopping on a low-frequency AC input signal;
b) a transformer configured to receive the high-frequency AC signal at a primary winding thereof, to perform a voltage conversion on the high-frequency AC signal, and to generate an output signal at a secondary winding of the transformer;
c) a rectifier module configured to generate a DC signal by rectifying the output signal at the secondary winding of the transformer;
d) wherein the high-frequency switch network comprises a low-frequency AC input port, first, second, third, and fourth switches, and an energy storage module;
e) wherein the low-frequency AC input port, the first and second switches, the primary winding, and the energy storage module are coupled to form a first loop;
f) wherein the third and fourth switches, the primary winding, and the energy storage module are coupled to form a second loop; and
g) wherein the first loop and the second loop do not operate at the same time.

14. The switching power supply circuit of claim 13, wherein:
a) first terminals of the first and second switches are respectively coupled to two terminals of the low-frequency AC input port;
b) a second terminal of the first switch is coupled to a first terminal of the third switch;
c) a second terminal of the second switch is coupled to a first terminal of the fourth switch;
d) second terminals of the third and fourth switches are coupled together;
e) the energy storage module and the primary winding of the transformer are coupled between first and second nodes;
f) the first node is a common node of the first and third switches; and
g) the second node is a common node of the second and fourth switches.

15. The switching power supply circuit of claim 13, wherein:
a) the first, second, third, and fourth switches are successively connected in series;
b) a first terminal of the first switch and a second terminal of the fourth switch are respectively coupled to two terminals of the low-frequency AC input port;
c) the energy storage module and the primary winding of the transformer are coupled between first and second nodes;
d) the first node is a common node of the second and third switches; and
e) the second node is a common node of the fourth switch and the low-frequency AC input port.

16. The switching power supply circuit of claim 14, wherein the energy storage module comprises a first capacitor coupled in series with the primary winding between the first and second nodes.

17. The switching power supply circuit of claim 16, wherein the energy storage module further comprises a first inductor coupled in series with the first capacitor and the primary winding between the first and second nodes.

18. The switching power supply circuit of claim 16, wherein the energy storage module further comprises a second capacitor coupled in parallel with the primary winding.

19. The switching power supply circuit of claim 14, wherein:
a) during a positive half cycle of the low-frequency AC input signal, the first and third switches remain on, and the second and fourth switches are alternately turned on or off in a high-frequency PWM mode; and
b) during a negative half cycle of the low-frequency AC input signal, the second and fourth switches remain on, and the first and third switches are alternately turned on or off in the high-frequency PWM mode.

* * * * *